UNITED STATES PATENT OFFICE.

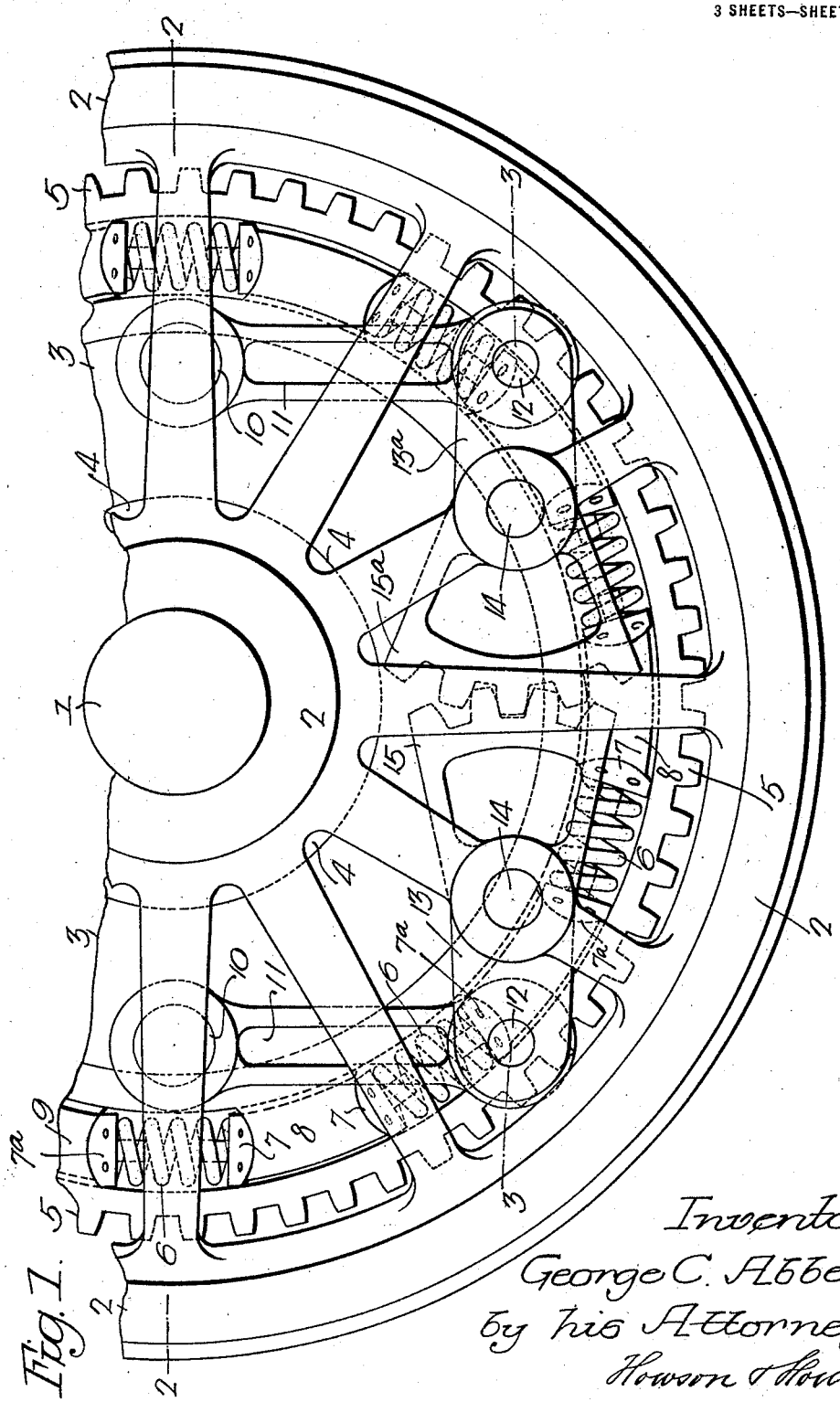

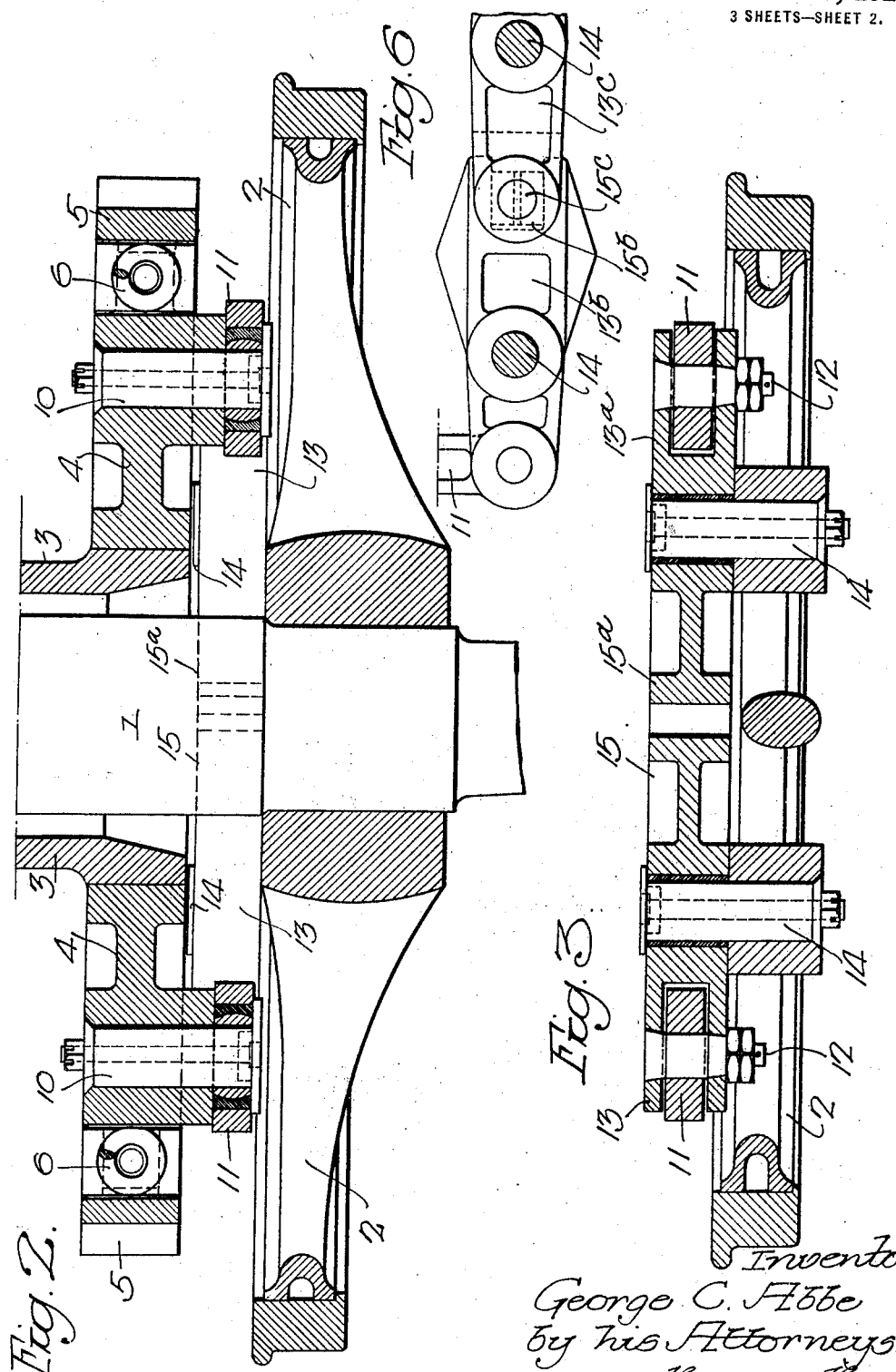

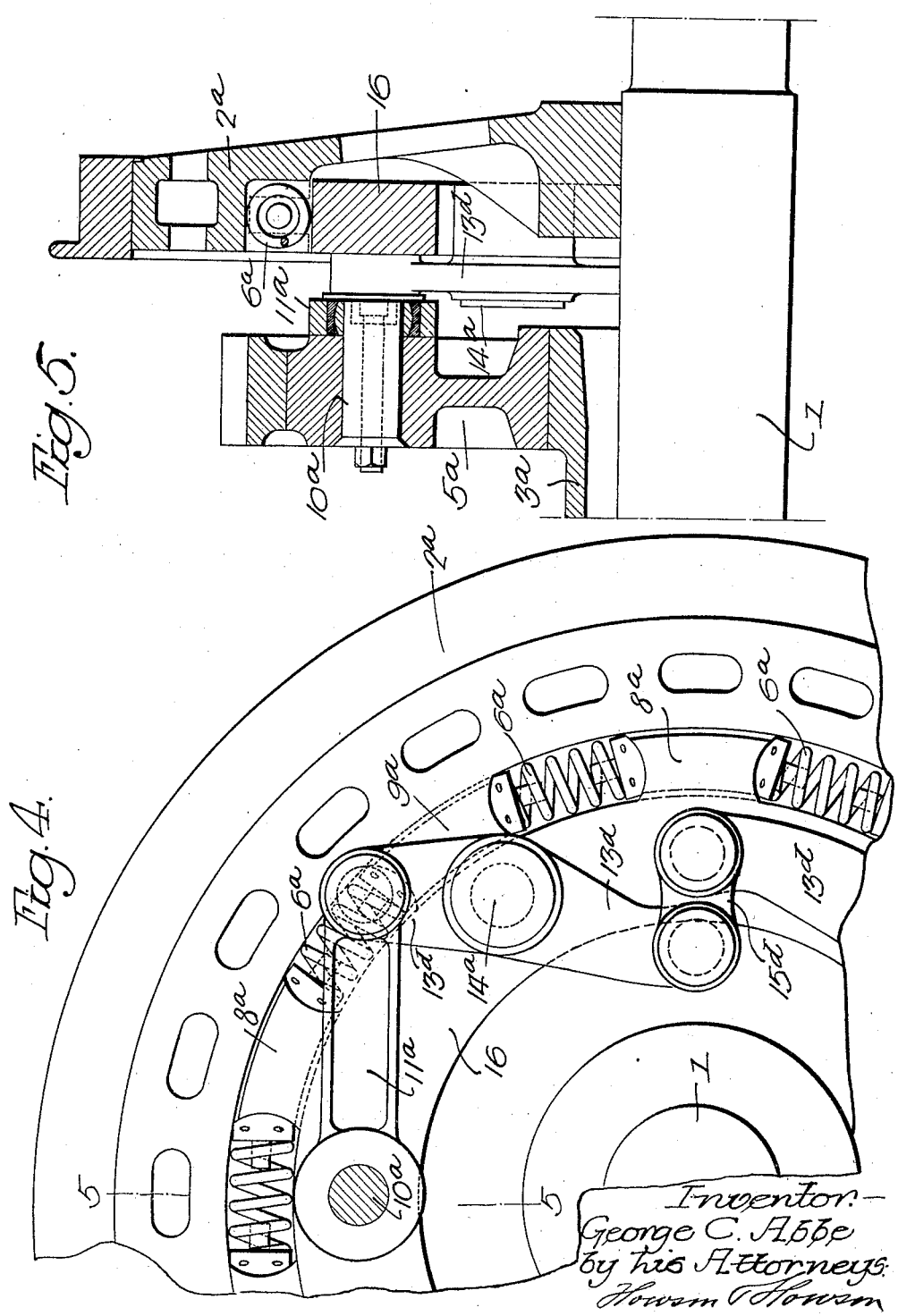

GEORGE C. ABBE, OF LANSDOWNE, PENNSYLVANIA, ASSIGNOR TO THE BALDWIN LOCOMOTIVE WORKS, OF PHILADELPHIA, PENNSYLVANIA, A CORPORATION OF PENNSYLVANIA.

QUILL-DRIVE FOR ELECTRIC LOCOMOTIVES.

1,401,230.  Specification of Letters Patent.  Patented Dec. 27, 1921.

Application filed November 4, 1921. Serial No. 512,832.

*To all whom it may concern:*

Be it known that I, GEORGE C. ABBE, a citizen of the United States, residing in Lansdowne, Delaware county, Pennsylvania, have invented certain Improvements in Quill-Drives for Electric Locomotives, of which the following is a specification.

My invention relates to certain improvements in driving mechanism for electric locomotives, of the type known as a "quill drive."

The object of the invention is to provide a yielding means between the quill and the driving wheels.

This object I attain in the following manner, reference being had to the accompanying drawings, in which:

Figure 1 is a face view of the lower portion of a driving wheel of an electric locomotive, illustrating my invention;

Fig. 2 is a sectional view of the wheel, showing a portion of the quill, the section being on the line 2—2, Fig. 1;

Fig. 3 is a sectional view on the line 3—3, Fig. 1;

Fig. 4 is a face view of a portion of a wheel illustrating a modification of the invention;

Fig. 5 is a sectional view on the line 5—5, Fig. 4; and

Fig. 6 is a view of another modification.

Referring to the drawings, 1 is the axle of an electric locomotive, in the present instance. Secured to this axle is the driving wheel 2. 3 is a quill, which surrounds the axle and extends from side to side of the locomotive, but is independent of the axle. Secured to this quill is a hub section 4 on which is mounted a gear ring 5, which is driven by a pinion of the electric motor, which is carried by the quill. Located between these two parts is a series of coiled springs 6. In the present instance the seats 7 for these springs are curved at the back and are adapted to curved bearings in projections 8 on the hub section 4, while the spring seats $7^a$, which are also curved at the back, are adapted to bearings in the projections 9 on the toothed ring 5 so that the gear ring yieldingly drives the hub section carried by the quill.

The construction of this spring arrangement may be modified without departing from the essential features of the invention.

The hub section 4 of the quill has two pins 10 to which are attached the links 11 connected by pins 12 to the two levers 13, $13^a$, mounted on pins 14, which project from the driving wheel 2. The levers 13, $13^a$ have toothed segments 15, $15^a$, respectively, which intermesh so that any movement imparted to one lever will be imparted to the other lever.

From the above construction, it will be seen that while the wheels of the locomotive are driven positively from the quill, any uneven movement of the axle and its wheels in the pedestals will not affect the quill, nor will any jarring motion be transmitted to the motor, as the springs 6 absorb the shock.

In some instances, the levers may be arranged as shown in Fig. 6, in which one lever $13^b$ is slotted to receive a plug $15^b$ carried by a pin $15^c$ extending from a lever $13^c$ so that the two levers will be moved in unison.

In Figs. 4 and 5, another modification is illustrated in which the springs $6^a$ are mounted between a wheel $2^a$ and a ring 16 mounted within the wheel, as shown clearly in Fig. 5, the ring having projections $8^a$ and the wheel having projections $9^a$ between which the springs $6^a$ are located. In this instance, the driving pins $10^a$ are mounted on a gear wheel $5^a$ on the quill $3^a$ and the pin $10^a$ is connected by a link $11^a$ to one arm of a lever $13^d$ mounted on a pivot pin $14^a$ carried by the ring 16. The other arm of the lever $13^b$ is connected to a similar arm of another lever $13^d$ at the opposite side of the wheel by a link $15^d$. In this construction, the ring 16 is driven positively and the springs are located between the ring and the wheel.

I claim:

1. The combination of an axle; a driving wheel; a quill; a link connection between the quill and the wheel so that the wheel will be flexibly driven; and spring mechanism located between the wheel and the quill, whereby any shocks taken by the wheel will be absorbed by the spring mechanism.

2. The combination of an axle; a quill surrounding the axle; a hub mounted on the quill; a gear ring carried by the hub; springs located between the gear ring and the hub; pins on the hub; a driving wheel; pins thereon; levers pivotally mounted on each pin of the driving wheel; and links connecting the levers with the pins on the hub, the two levers intermeshing so that motion imparted to one lever will be imparted to the other.

GEORGE C. ABBE.